US006910128B1

(12) United States Patent
Skibbie et al.

(10) Patent No.: US 6,910,128 B1
(45) Date of Patent: Jun. 21, 2005

(54) METHOD AND COMPUTER PROGRAM PRODUCT FOR PROCESSING SIGNED APPLETS

(75) Inventors: Donna Skibbie, Round Rock, TX (US); Anthony Joseph Nadalin, Austin, TX (US); Bruce Arland Rich, Round Rock, TX (US); Theodore Jack London Shrader, Austin, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 09/717,524

(22) Filed: Nov. 21, 2000

(51) Int. Cl.[7] .................................................. H04L 9/00
(52) U.S. Cl. ....................... 713/170; 713/168; 713/169; 713/200; 713/201; 717/177
(58) Field of Search .............................. 713/167–170, 713/200–201, 187–189; 717/107, 177

(56) References Cited

U.S. PATENT DOCUMENTS

| | | | | |
|---|---|---|---|---|
| 5,805,829 A | * | 9/1998 | Cohen et al. ............... | 709/202 |
| 6,091,835 A | * | 7/2000 | Smithies et al. ............ | 382/115 |
| 6,157,721 A | * | 12/2000 | Shear et al. ................ | 380/255 |
| 6,263,442 B1 | * | 7/2001 | Mueller et al. ............. | 713/201 |
| 6,321,334 B1 | * | 11/2001 | Jerger et al. ................ | 713/200 |
| 6,477,647 B1 | * | 11/2002 | Venkatraman et al. ...... | 713/193 |
| 6,499,109 B1 | * | 12/2002 | Balasubramaniam et al. .... | 713/ 201 |
| 6,598,167 B2 | * | 7/2003 | Devine et al. ............... | 713/201 |
| 2003/0177394 A1 | * | 9/2003 | Dozortsev .................... | 713/201 |
| 2004/0083367 A1 | * | 4/2004 | Garg et al. .................. | 713/170 |

OTHER PUBLICATIONS

Halloran, Dr. M. et al, The Impact of the DoD Mobile Code Policy on Advanced Distributed Learning, Web–based Distance Learning & other Educational Missions, IITA/ADL CoLaboratory, "www.usafa.af.mil/iita/Documents/mobile%20code.pdf", Aug. 30, 2001, all.*
Griscom, Daniel, "Code Signing for Java Applets", Daniel T. Griscom Web site "http://www.boran.com/security/Doc_CodeSigning.html#both", 1998, entire document.*

* cited by examiner

Primary Examiner—Gregory Morse
Assistant Examiner—Ronald Baum
(74) Attorney, Agent, or Firm—Jeffrey S. LaBaw; Joseph R. Burwell; David Judson

(57) ABSTRACT

A framework for processing signed applets that are distributed over the Internet. Using the framework, an applet that is packaged as a Netscape- or JDK-signed jar file, or as an Internet Explorer-signed cab file, is processed within the same Java runtime environment irrespective of the browser type (i.e. Netscape Communicator, Internet Explorer or JDK) used to execute the applet. When the applet is executed, the framework verifies one or more applet signatures using the same algorithm that was used to sign the applet, verifies the signer(s) of the applet, and stores information about the signers so that they can be honored by a security policy when permissions for the applet are determined.

21 Claims, 5 Drawing Sheets

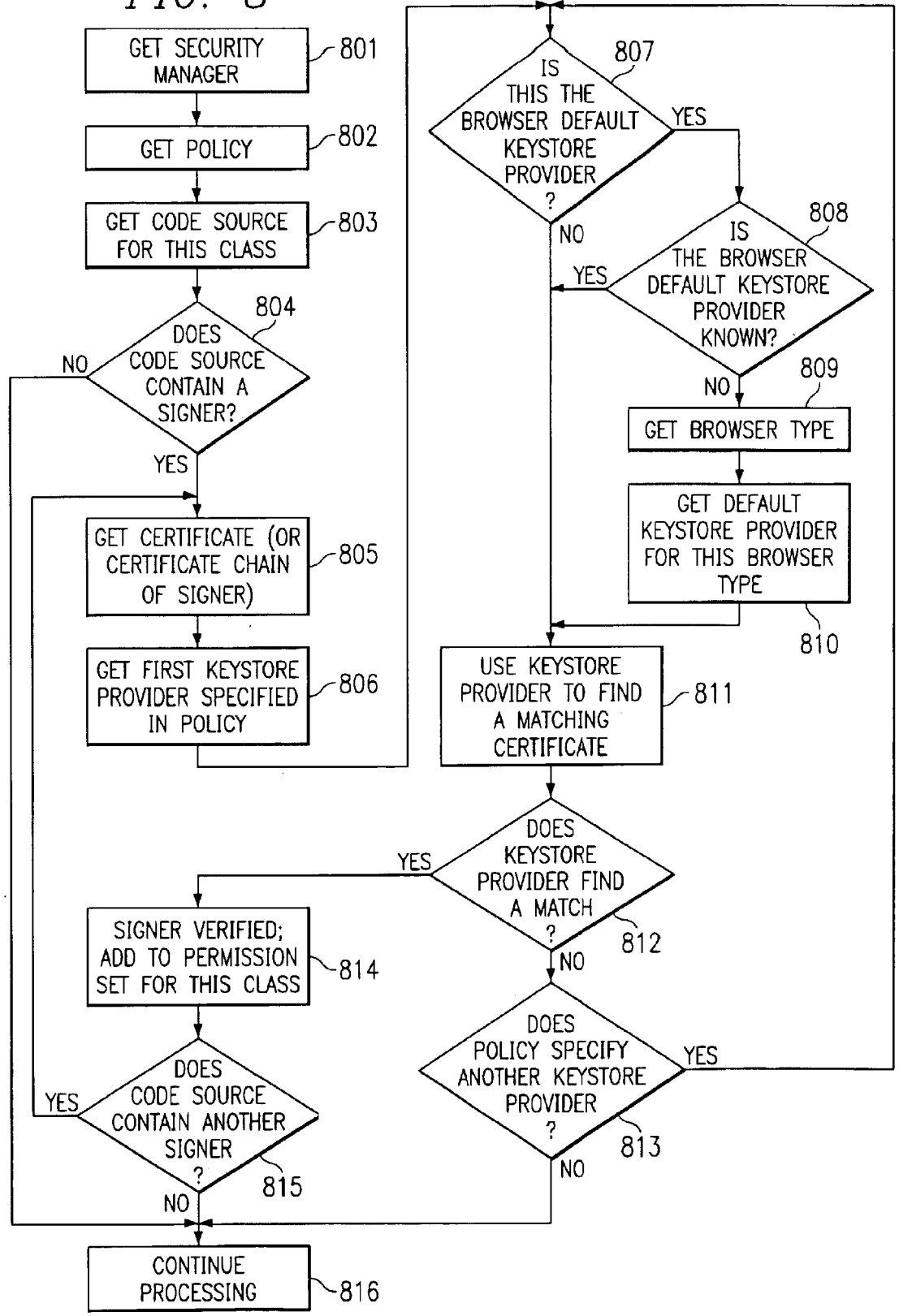

METHOD AND COMPUTER PROGRAM PRODUCT FOR PROCESSING SIGNED APPLETS

BACKGROUND OF THE INVENTION

1. Technical Field

The present invention relates generally to processing signed Java applets in a Java runtime environment.

2. Description of the Related Art

Java™, originally developed by Sun Microsystems, is a known software programming environment in which software programs, known as Java applets or applications, are developed, tested and maintained. Java programs have found extensive use on the World Wide Web, which is the Internet's multimedia information retrieval system.

About a year ago, Sun's JavaSoft introduced the Java 2 development platform. The Java 2 Java runtime environment (JRE) includes a Plug-in that allows developers and users to run applets in their web browsers with different JREs. The ability to specify other JREs allows developers to call Java 2 methods within their applets. Applets running with the Java Plug-in can create Java 2 security objects and call their related methods. One common use of these methods is to request a permission for an applet, such as permission to access a file or thread resources, that ordinarily is not granted to the applet.

It is often desirable to sign an applet so that a user can verify that the applet is supplied from a trusted source. Currently, there are at least three different prevalently used methods for distributing a signed Java applet over the Internet: Java Development Kit (JDK), Netscape, and Internet Explorer. These methods, however, differ from each other in several ways. JDK uses a JDK-signed "jar" file to distribute the signed applet, which can be executed in a browser based on the JDK security model. The algorithm used to verify the signature in the applet is DSA/SHA1, and the certificate database used to verify signers of the applet is keystore and/or cacerts. JDK is the policy used to honor the signers of the applet when determining permissions. Netscape uses a Netscape-signed jar file to distribute the signed applet, which can only be executed by Netscape Communicator. The algorithm used to verify the signature in the Netscape-signed applet is RSA/MD5, and the certificate database used to verify. signers of the applet is cert7.db or a certificate server. The policy used to honor signers of the applet when determining permissions is Netscape-specific. The Microsoft Internet Explorer method uses a signed "cab" file to distribute the signed applet, which can only be executed by Internet Explorer. The algorithm used to verify signatures in the applet is RSA/MD5, and the certificate database used to verify signers is Microsoft system store or user store. The policy used to honor the signers of the applet when determining permissions is Internet Explorer-specific.

Because of these differences, the various distribution methods are incompatible. For example, the signatures of an applet that was signed using the Netscape method cannot be verified and honored by Internet Explorer. Similarly, the signatures of an applet that was signed using the Internet Explorer method cannot be verified and honored by Netscape Communicator. Therefore, if an applet developer wants to distribute a signed applet to all three browser types (Netscape Communicator, Internet Explorer, and JDK-based browsers), the developer must go through the inconvenience of packaging the applet in three different ways and supporting three different types of certificate database and security policy configurations. FIGS. 1A–1C illustrate the three ways of packaging applets that exists in the prior art due to these incompatibilities.

The Java Plug-in module, which is provided with the Java Runtime Environment (JRE), provides one limited solution to this problem. This solution allows developers to distribute applets signed using the JDK method to Netscape Communicator and Internet Explorer, as well as to JDK-based browsers. FIG. 2 illustrates the solution offered by the Java Plug-in method. While this approach has some advantages, the Java Plug-in solution supports only the JDK method. This method is unsatisfactory to developers and users on the Netscape Communicator and Internet Explorer platforms, which are far more popular.

One problem with the JDK method is that it is less secure than the Netscape Communicator and Internet Explorer methods. In particular, the DSA/SHA1 algorithm that is used by JDK to produce signatures is weaker than the RSA/MD5 algorithm that is used to produce signatures by Netscape and Internet Explorer. Also, the JDK method does not check whether any of the certificates in a subject's certificate chain have expired. Another problem with the JDK method is that does not support the Netscape and Internet Explorer certificate and key databases. Therefore, before a developer on the Netscape or Internet Explorer platform can sign an applet using the JDK method, the developer must configure a JDK certificate and key database. Also, before a Netscape or Internet Explorer user can verify the signatures in applets that were signed using the JDK method, the user must configure a JDK certificate database. Yet another problem with the JDK method is that it does not support dynamic verification of signers based on the signer's certificate chain to a trusted certificate authority, as does Netscape and Internet Explorer. Using the JDK method, a user must configure the signer in-the certificate database before a user can download an applet signed by that signer.

As one of ordinary skill in the art will appreciate, the Java Plug-in solution has several problems when used with signed applets. The major problem is that the only kind of signed applets supported by the Java Plug-in solution are JavaSoft signed applets. Thus, the many Netscape-and Internet Explorer-signed applets either cannot be verified or are not supported. The JavaSoft method of verifying signed applets is less secure and flexible than the methods used by Netscape and Internet Explorer, mainly because of the weaker and less flexible verification algorithms and procedures used by the JavaSoft JDK.

The present invention addresses these and other deficiencies of the prior art.

BRIEF DESCRIPTION OF THE INVENTION

The present invention provides a framework for processing signed applets that are distributed over the Internet. Using the framework, an applet that is packaged as a Netscape-or JDK-signed jar file, or as an Internet Explorer-signed cab file, is processed within the same Java runtime environment irrespective of the browser type (i.e. Netscape Communicator, Internet Explorer or JDK) used to execute the applet. When the applet is executed, the framework verifies one or more applet signatures using the same algorithm that was used to sign the applet, verifies the signer(s) of the applet, and stores information about the signers so that they can be honored by a security policy when permissions for the applet are determined. The framework preferably verifies the signer of the applet by verifying that the signer is in a default certificate database for the browser and that the signer's certificate has not expired, and/or by verifying that the signer contains a certificate chain to a trusted certificate authority that is in a default certificate authority database, that each certificate in the chain contains a signature that can be verified by a public key of its issuer, and that each certificate in the chain has not yet expired.

According to another aspect of the invention, a method for executing a signed applet packaged in a given file (e.g., a jar file or a cab file) includes a number of process steps. Upon loading a given class, the method begins by determining whether a signer in the given file applies the class. If so, a verification routine is executed to verify the signer that generated the signature. Following a successful verification, the method continues by determining whether the signer is identified in a policy entry. If so, the routine populates a permission set for the class by awarding the class a given permission as specified in the policy entry. When the applet makes an initial request that requires the permission, the permission set of the class is then used to determine whether the class has the requisite permission.

The invention also provides a computer program product for managing signed applets in a Java runtime environment. The computer program product includes an applet class loader for loading a set of applet classes archived in a signed file, a set of signature engine classes for verifying applet class signatures, and a security manager class callable by the applet class loader upon receipt of an initial request that requires a given permission. In response, the security manager class invokes a policy file class that verifies a signer based on the existence of a matching certificate in a set of keystores.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 8 is a flowchart illustrating a technique for verifying the signers of an applet according to the invention.

DETAILED DESCRIPTION OF THE PREFERRED EMBODIMENT

Figure 1A:
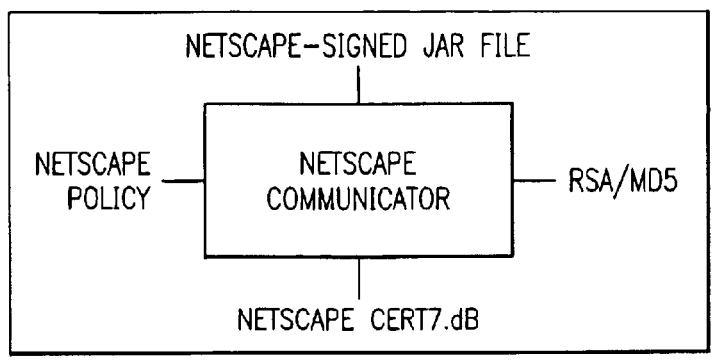
FIGS. 1A–1C illustrate the three ways of packaging applets that exists in the prior art.
Figure 1B:
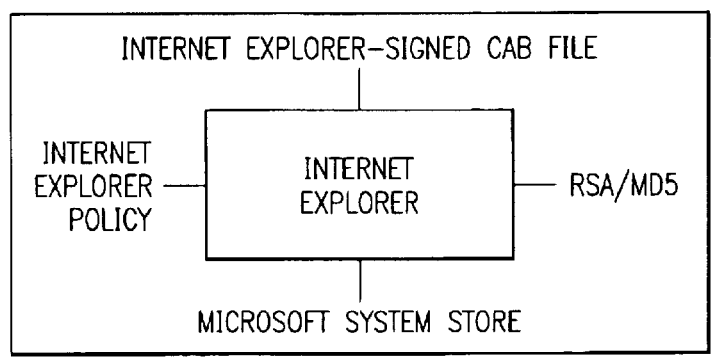
Figure 1C:
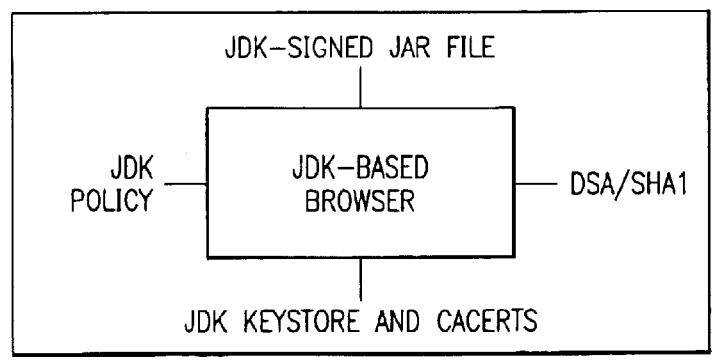
Figure 2:
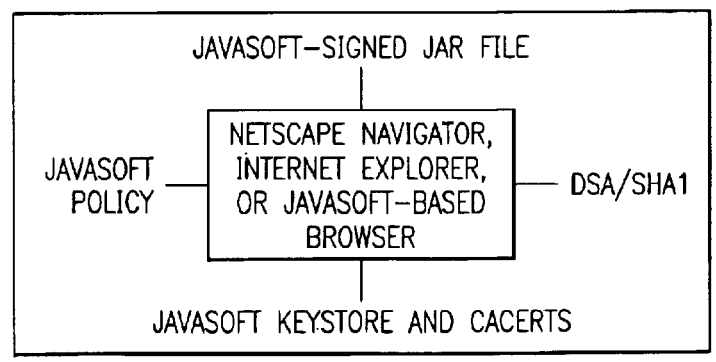
FIG. 2 illustrates how the Java Plug-in module may be used to address the problem of packaging signed applets across incompatible platforms that is addressed by the present invention.
Figure 3:
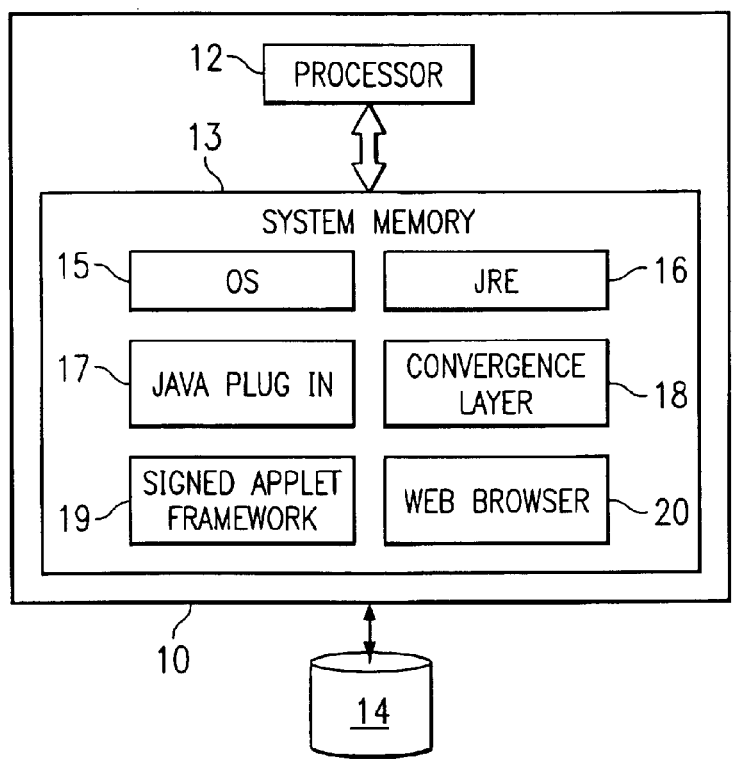
FIG. 3 illustrates a computer in which the inventive architecture is supported.

As will be described below, one or more of the processes that comprise the present invention may be carried out on a computer, or on one or more computers connected via a computer network. Referring to FIG. 3, a computer for use in implementing the present invention is shown. The computer 10 has a processor 12, system memory 13, permanent memory 14, an operating system 15, a Java Runtime Environment ("JRE") 16, a Java Plug-in 17, a an optional convergence layer 18, and a browser 20 that supports the Java plug-in 17. The Signed Applet Framework 19 of the present invention is also illustrated. A representative computer is any personal computer or workstation platform that is Intel-, PowerPC®- or RISC-based, and that includes an operating system such as Microsoft Windows™ NT with Service Pack 4 installed, JRE Java 2 with the Java plug-in for Java 2 installed, and a browser that supports the Java plug-in, such as Netscape Communicator 4.06. This configuration, of course, is not to be taken to limit the invention. The optional convergence layer 18 provides a mapping layer of classes to translate applet calls originally written to Netscape security methods and classes to Java 2 methods and classes. Likewise, the optional convergence layer provides a mapping layer of classes to translate applet calls originally written to Internet Explorer security methods and classes to Java 2 methods and classes. The optional convergence layer is described generally in copending application Ser. No. 09/366,464, filed Aug. 3, 1999, titled JAVA CONVERGENCE OF BROWSER-SPECIFIC SECURITY MODELS and assigned to the assignee of the present application.

Figure 4:
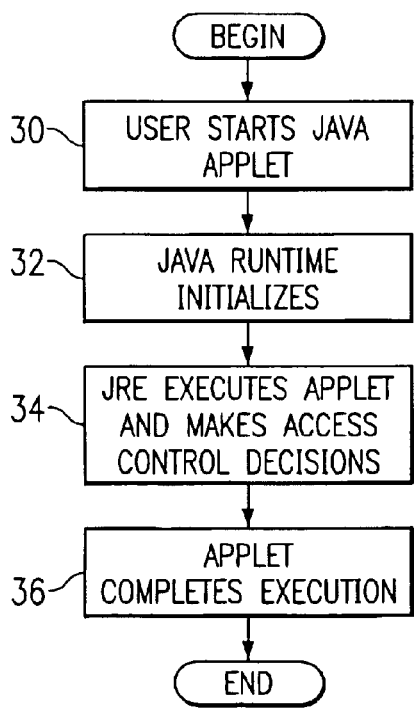
FIG. 4 is a high level flowchart illustrating the applet operating environment in which the present invention is implemented.

FIG. 4 is a high level flowchart illustrating the operating environment in which the present invention is implemented. By way of brief background, the inventive signed applet class support preferably is built into a Java Virtual Machine (JVM) by modifying and enhancing core JRE classes, as will be described in more detail below. Alternatively, the signed applet class support may be provided as standalone code. These changes make the support provided by the signed applet class module 19 available to both Java applets running in browsers and, optionally, Java applications running in a Java interpreter.

As is well-known, an applet is typically served to a client machine when the user downloads a web page that includes an applet-specific tag and that tag is parsed by a web browser. After the applet is downloaded from a server to the client, the applet can be initialized and run. As seen in the flowchart, the routine begins at step 30 when the browser starts a Java program, viz., the applet. At step 32, the Java Runtime Environment (JRE) initializes. In particular, when a JVM is created, as a result of the Web browser loading a Java applet, the JRE is initialized.

During the initialization process, the JRE loads each class in the applet and, in Java 2, creates a CodeSource for each class. A CodeSource could be thought of as the identity of the class. If a class is signed, the JRE verifies the signatures, obtains the names of the signers, and stores the names of the Signers in the CodeSource. The signers are verified when the ProtectionDomain of the class is initialized as described in the next paragraphs.

Another aspect of initialization is creation of a JVM Policy object. Creation of the Policy object is implementation-dependent. The Policy object is typically created through the PolicyFile class. On initialization, PolicyFile reads permission information stored in static policy files in the system's filesystem. Standard Java implementations support policy files containing permissions to be granted to requesters.

An operation tied closed to the Policy initialization is the association of a ProtectionDomain to each class that is loaded. A ProtectionDomain is a class that couples a CodeSource with a set of permissions granted to that CodeSource A ProtectionDomain maps a class to its permissions. When the JRE creates a ProtectionDomain for a class, the JRE verifies the signers of the class and determines which permissions apply to the class.

Returning to FIG. 4, the routine continues at step 34 with the execution of the Java applet. In the course of applet execution, it is likely that protected resources will be required. For example, a file may need to be read or written, or a socket may need to be opened. Each time a protected resource is accessed, an access control check is performed. At step 36, the Java applet completes its execution. At this point, the JVM terminates.

Figure 5:
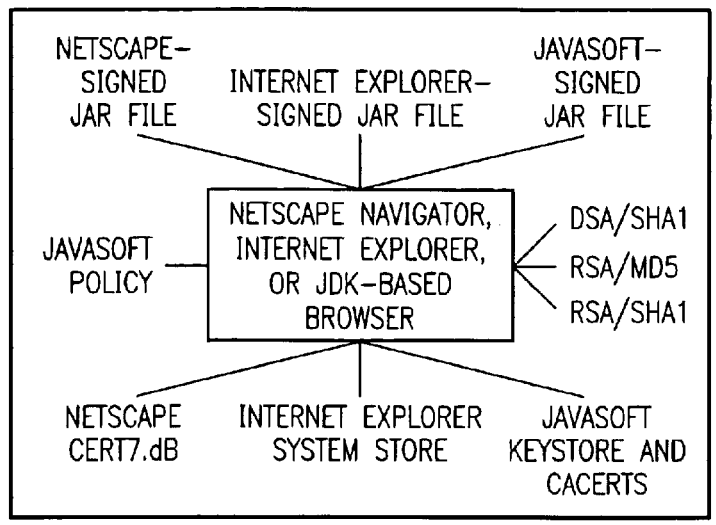
FIG. 5 is a simplified illustration of the inventive signed applet framework.

The inventive signed applet framework adds support to the Java Plug-in for applets signed using disparate methods (e.g., JDK, Netscape, Internet Explorer, and others) and that rely on different certificate databases for signature verification. FIG. 5 illustrates the solution provided by the present invention. As can be seen, the applet framework is advantageous because it supports multiple kinds of signed jar files (Netscape and JDK), multiple kinds of signature algorithms (DSA/SHA1, RSA/MD5, and RSA/SHA1), and multiple kinds of certificate databases (Netscape, Internet Explorer, and JDK). Also, as will be seen, the inventive solution allows the user to configure more than one certificate database and the sequence in which certificate databases are searched. Further, in the event that new signature algorithms and certificate authorities become widely used, the needed methods and databases can be easily accommodated in the framework.

By way of background, the applet developer preferably creates and packages the applet as follows. The applet developer first codes the applet, for example, using the JDK security APIs. The applet is then packaged, e.g., as a Netscape-signed jar file (using, for example, the Netscape signtool), as a JDK signed jar file (using, for example, JDK jarsigner), as Internet Explorer-signed cab file, or the like. The applet developer then codes an HTML file that references the applet and the signed jar/cab file containing the applet. The HTML code may include one or more of the following tags: an OBJECT tag containing information about the Java Plug-in, the applet, and the signed cab file, an EMBED tag containing information about the Java Plug-in, the applet, and the signed jar file, or an APPLET tag containing information about the applet and the signed jar file. The OBJECT tag is required if the applet will be executed from Internet Explorer. The EMBED tag is required if the applet will be executed from Netscape Communicator. The APPLET tag is required if the applet will be executed from a JDK browser. The applet developer then installs the HTML file and the jar/cab file containing the applet in a web server directory. The applet then is accessible through a URL in a known manner.

The Java Plug-in uses the following JavaSoft classes to load classes from JavaSoft-signed jar files and to process the signature information in a JavaSoft-signed jar file:

AppletClassLoader
AppletSecurityManager
A jar file processor (JarFile)
A signature provider (e.g., from Sun Microsystems)
A JavaSoft DSA/SHA1 signature engine (called DSA)
A JavaSoft policy implementation (PolicyFile)
A JavaSoft certificate database interface (JavaKeyStore)

In a representative embodiment, the present invention provides the following additional and replacement classes to those used by the Java Plug-in:

A replacement AppletClassLoader
A new CAB file processor (CABFile)
A new signature provider (SignedAppletFramework)
A new RSA/MD5 signature engine
A new Netscape cert7.db interface (NSCert7DB)
A new Netscapecertificate server interface (NSCertServDB)
A new Microsoft system store interface (MSSysCertDB)
A new Microsoft user store interface (MSUserCertDB)

Figure 6:
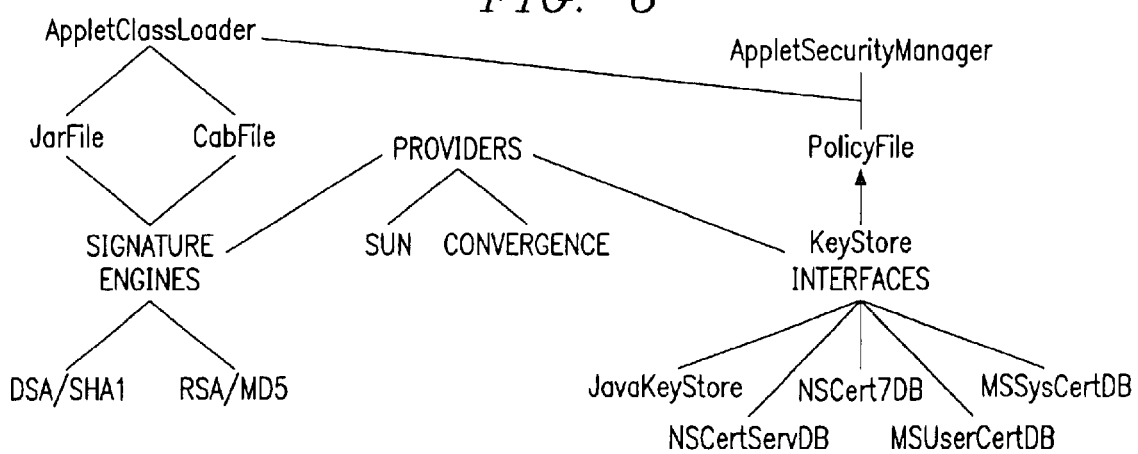
FIG. 6 is a class interrelationship diagram for the inventive framework.

FIG. 6 illustrates the basic interrelationship of the above-identified classes. This drawing shows the relationship between classes as opposed to a class hierarchy. As can be seen, the Java Plug-in or the user application calls AppletclassLoader to load the applet classes. AppletClassLoader determines that the applet classes are archived in a signed jar or cab file and calls JarFile or CabFile to load classes from the jar or cab file. JarFile or CabFile uses one of the signature engine classes (e.g., DSA/SHA1, RSA/MD5, or RSA/SHA1) to verify the signature, which are provided (in this illustrative embodiment) by the signature (e.g., Sun and SignedappletFramework) providers. The first time an applet or application makes a request that requires permission, AppletSecurityManager is called. AppletSecurityManager invokes PolicyFile, which verifies the signer based on a matching certificate in one of the KeyStore interfaces (e.g., JavaKeyStore, NSCretServDB, NSCert7DB, MSSysCertDB, or MSUserCertDB).

The following briefly describes how each of the new and replacement classes are implemented in an illustrative embodiment.

AppletClassLoader

The replacement class loader reads the java.security file to get the user's certificate database (keystore.type) and the user-specific certificate database (if applicable). It stores this information in a system properties file. The loader then loads the applet using either JarFile or CabFile, depending on how the jar file is archived.

SignedAppletFramwork

This signature provider contains information about the signature algorithm (RSA/MD5) and the certificate database interfaces (NSCert7DB, NSCertServDB, MSSysCertDB, and MSUserCertDB).

RSA/MD5

The RSA/MD5 signature engine provides an implementation of a JavaSoft signature engine that verifies signatures using the RSA encryption algorithm and the MD5 hash algorithm. Both of these are published algorithms.

NSCert7DB The NSCert7DB interface provides an implementation of a JavaSoft keystore that interfaces with the Netscape cert7.db, e.g., using the Berkeley DB 1.85 APIs.

NSCertServDB

The NSCertServDB interface provides an implementation of a JavaSoft keystore that interfaces with a Netscape certificate server using the Netscape certificate APIs.

MSCertServDB

The MSCertServDB interface provides an implementation of a JavaSoft keystore that interfaces with a Microsoft system store certificate database using the Microsoft CryptoAPIs.

MSUserCertDB

The MSUserCertDB interface provides an implementation of a JavaSoft keystore that interfaces with a Microsoft user store certificate database using the Microsoft CryptoAPIs.

The basic operation of the inventive signed applet framework is now generally described. The routine begins when a user at a client machine uses one of the supported browser types (e.g., Netscape Communicator, Internet Explorer, JDK or the like) to select from a web server an applet referenced in an HTML (or other markup language) tag. As described above, it is assumed that the applet developer has coded the HTML tag as described above (i.e. with an OBJECT tag, an EMBED tag or an APPLET tag, depending on the type of browser involved) and has packaged the applet appropriately (e.g., as a Netscape-signed jar file, a JDK-signed jar file, or the like). The Java Plug-in is started and information about the applet is passed thereto. In particular, if the user is using the Netscape browser, the browser starts the Java Plug-in and passes the applet information. This operation occurs automatically because of the way the applet developer codes the HTML tag for this browser type. The Java Plug-in then uses a Java class loader to load classes from the Netscape-or JDK-signed jar file. Similarly, if the user is using Internet Explorer, the browser starts the Java Plug-in and passes in information about the applet. As described above, this happens automatically because of the way the applet developer codes the HTML tag for this browser type. The Java Plug-in then uses the Java class loader to load classes from the Netscape- or JDK-signed jar file as previously described. If the user is using a JDK browser, the browser uses the class loader to load classes from the Netscape- or JDK-signed jar file.

When the JRE loads a class from the applet, it determines whether any of the signatures in the jar file apply to the class being loaded. If so, the JRE uses the framework to execute the first part of a verification procedure, which verifies the signature information. Later, the JRE uses the framework to execute the second part of a verification procedure, which verifies the signer information of a class against the user's certificate database and determines whether the signers are the same as those specified in given JDK policy entries. The JRE then populates a permission set for the class by comparing the signer and URL address information in each JDK policy entry with the signers and URL address of the class. If they match, the JRE awards the applet the permission specified in the policy entry. Each time a class from the applet makes a request that requires permission, a security manager is called. The security manager uses the permission set of the class to determine whether the class has the correct permission.

Thus, the framework performs a verification procedure. The verification procedure verifies each signature in the jar file, verifies the identity of each signer that generated a signature, attaches information about each signer to the classes signed by the signer, and determines whether any class signers are the same as signers specified in JDK policy entries. The way the verification procedure is performed depends on a setting of a verification.type field in a java.security file. Preferably, to accommodate prevalently used Java applets there are at least three different verification procedure types. Those skilled in art would recognize that the framework is flexible and additional verification procedures and types can be added as new methods of distributing signed applets come into use.

In verification procedure A, the framework does the following: (a) verifies each signature in the jar file using the same signature algorithm that was used to generate each signature, (b) determines whether any of the verified signatures in the jar or cab file apply to the class being loaded and, if so, gets the certificate chain for each signer of the class and attaches the certificate chain to the class, and (c) for each entry in the policy file in which a signer is specified: (i) gets a certificate for the specified signer from the certificate database, (ii) determines whether the specified signer's certificate matches the certificates of any of the signers attached to the class, and (iii) if so, verifies that the public keys of the two certificates are the same and that both certificates are still valid. Steps (b) and (c) are repeated each time a subsequent class form the signed jar file is loaded.

In verification procedure B, the framework does the following: (a) verifies each signature in the jar file using the same signature algorithm that was used to generate each signature, (b) determines whether any of the verified signatures in the jar or cab file apply to the class being loaded and, if so, gets the certificate chain for each signer of the class and attaches the certificate chain to the class, (c) for each certificate chain attached to the class: (i) parses through the certificate chain until a certificate for a certificate authority is found that matches one of the certificates for certificate authorities in the user's certificate database, (ii) ensures that the two certificates match, that their public keys match, and that they both are still valid, (iii) builds a verification certificate chain for the applet signer that ends with a certificate authority that contains a matching entry in the certificate database, (iv) verifies each signature in the verification certificate chain, and (v) verifies that each certificate in the verification certificate chain is still valid, and (d) for each signer specified in a policy entry, determines whether the specified Subject DN (distinguished name) or Unique ID matches the subject DN name or unique ID of any of the signers attached to the class. If so, the signer specified in the policy entry is assumed to be the same as one of the signers of the class. Each time a subsequent class from the signed jar file is loaded, the framework repeats steps (b)–(d).

Verification procedure C is a combination of the above procedures and can be used by users requiring the highest level of security. In this procedure, the framework does the following: (a) verifies each signature in the jar file using the same signature algorithm that was used to generate each signature, (b) determines whether any of the verified signatures in the jar file apply to the class being loaded and, if so, gets the certificate chain for each signer of the class and attaches the certificate chain to the class, (c) for each certificate chain attached to the class: (i) parses through the certificate chain until a certificate for a certificate authority is found that matches one of the certificates for certificate authorities in the user's certificate database, (ii) ensures that the two certificates match, that their public keys match, and that they both are still valid, (iii) builds a verification certificate chain for the applet signer that ends with a certificate authority that contains a matching entry in the certificate database, (iv) verifies each signature in the verification certificate chain, and (v) verifies that each certificate in the verification certificate chain is still valid, and (d) for each entry in the policy file in which a signer is specified: (i) gets a certificate for the specified signer from the certificate database, (ii) determines whether the specified signer's certificate matches the certificates of any of the signers attached to the class, and (iii) if so, verifies that the public keys of the two certificates are the same and that both certificates are still valid. Then, each time a subsequent class from the signed jar file is loaded, the framework performs steps (b)–(d).

Figure 7:
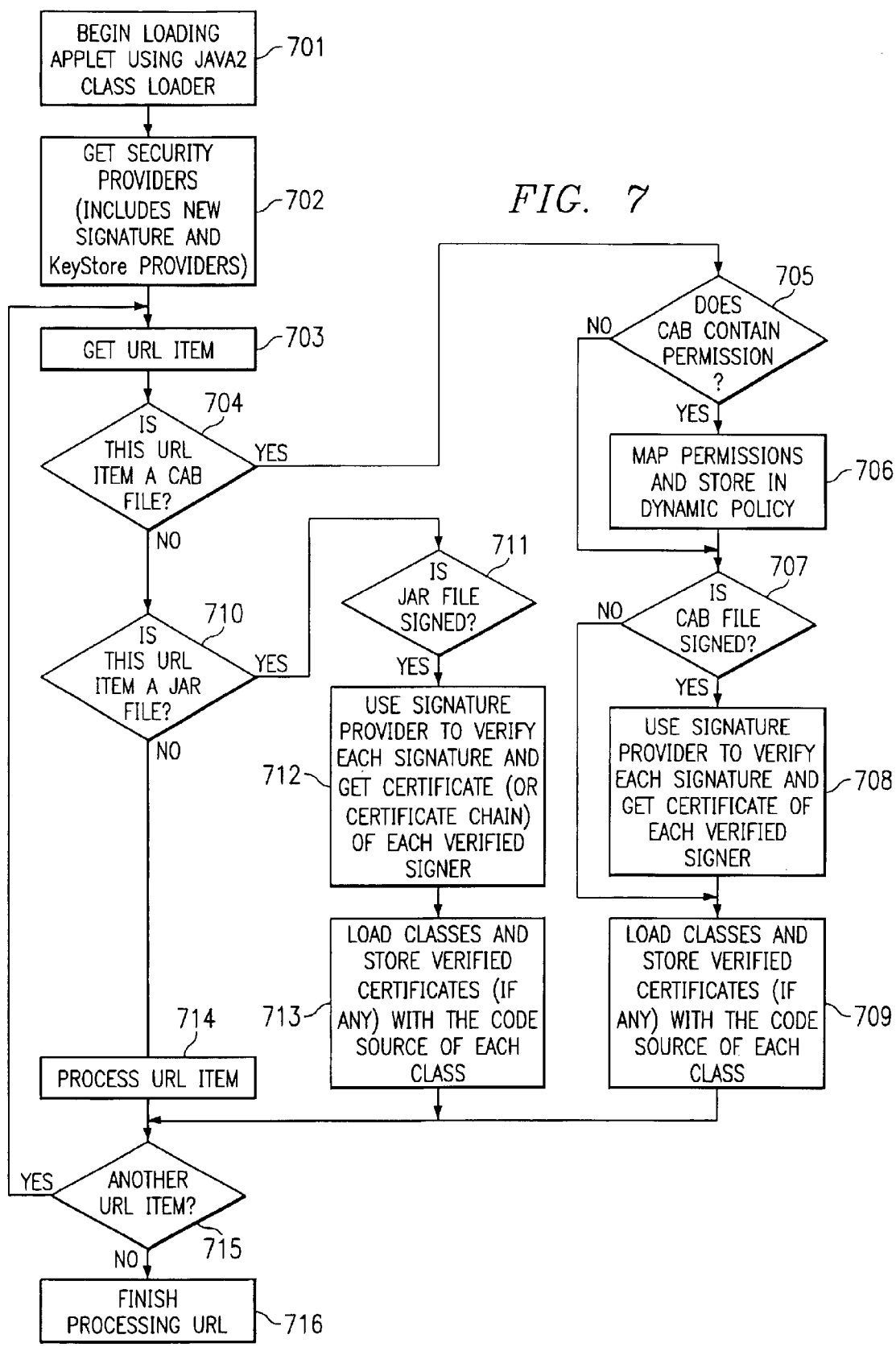
FIG. 7 is a flowchart illustrating a technique for verifying the signatures in an applet according to the present invention.

FIG. 7 illustrates a process to verify the signatures of an applet according to the present invention e.g., using Java 2 code. At step 701, the Java 2 applet class loader begins loading the applet. The Java 2 class loader (called Applet-ClassLoader below) is called either from the Java 2 application or by the Java Plug-in. At step 702, the class loader retrieves the security providers configured by the user. This includes new signature providers (supporting the DSA/SHA1 and RSA/MD5 signature algorithms) and new keystore providers (supporting the Netscape and Internet Explorer certificate databases). At step 703, the class loader retrieves the first URL item. At step 704, the class loader tests whether this URL item is a cab file. If so, the process continues at step 705. If not, the process continues at step 710. At step 705, the class loader tests whether the cab file contains any embedded permissions. If so, control continues at step 706. If not, however, control continues at step 707. At step 706, the permissions are mapped to Java 2 permissions and stored in a Java 2 dynamic policy, which will be merged with the Java 2 policy. At step 707, the class loader tests whether the cab file is signed. If so, control continues at step 708; if not, control continues at step 709. At step 708, the class loader attempts to verify each signature in the cab file using a signature provider that supports the same algorithm used to produce each signature. At step 709, the class loader loads each class from the cab file and stores the certificate or certificate chain of each verified signer (if any) in the CodeSource for the class. At step 710, the class loader tests whether URL item is a jar file. If so, control continues at step 711; if not, control continues at step 714. At step 711, the class loader tests whether the jar file is signed. If so, control continues at step 712; if not, control continues a step 715. At step 712, the class loader attempts to verify each signature in the jar file using a signature provider that supports the same algorithm used to produce each signature. At step 713, the class loader loads each class from the jar file and stores the certificate or certificate chain of each verified signer (if any) in the CodeSource for that class. At step 714, the class loader processes the URL item that is not a cab or jar file. At step 715, the class loader tests whether there are any other URL items. If so, control returns to step 703; if not, control continues at step 716. At step 716, the class loader finishes processing the particular URL to complete the process.

FIG. 8 illustrates the a process to verify the signers of an applet according to the present invention. The first time a class in the applet makes a request requiring permissions, the security manager configured for the applet is called. This is step 801. The security manager calls a check permission method. At step 802, the security manager gets a Java 2 policy (which includes a merge of a dynamic policy, if set). The routine then continues at step 803 with the security manager getting the CodeSource for the class making the request. At step 804, the security manager tests whether the CodeSource for this class contains a signer. If so, control continues at step 805; if not, control branches to step 816. At step 805, the security manager gets the certificate or certificate chain of the signer. At step 806, the security manager gets the first keystore provider specified in the Java 2 policy. At step 807 and 808, the security manager tests whether the specified keystore provider for this user is known. If so, control continues at step 811; if not, control continues at step 809. At step 809, the security manager gets the browser type of the user. A technique to achieve this operation is described in Ser. No. 09/366,463, titled DETERMINING BROWSER TYPE IN AN OPEN JAVA ENVIRONMENT and assigned to the assignee of this application.

At step 810, the security manager determines the keystore provider based on the browser type of the user. At step 811, the security manager uses the keystore provider to find a certificate that matches the signer's certificate or one of the certificates that is in the signer's certificate chain. The process then continues at step 812. At this step, the security manager tests whether the keystore provider found a match. If so, control continues at step 814; if not, control continues at step 813. At step 813, the security manager tests whether the policy specifies another keystore provider. If so, control returns to step 807; if not, the signer is ignored and control continues at step 815. At step 814, the security manager adds the signer's certificate or certificate chain to the set of permissions for this class. At step 815, the security manager tests whether the CodeSource contains another signer. If so, control returns to step 805; if not, control continues at step 816. At step 816, the security manager continues processing the check permission request to complete the process.

One of ordinary skill in the art will appreciate that the inventive framework provides many advantages over the prior art. For applet developers, the invention provides a single way of packaging signed applets so that they can be distributed to users of Netscape, Internet Explorer, and JDK-based browsers. For applet users, the inventive framework provides the ability to execute a Netscape- or JDK-signed jar file using any of the major browser types, using any of the major types of certificate databases. The invention also enables an applet user to configure the user's preferred certificate database if the user does not want to use a default certificate database. The framework also enables an applet user the ability to configure the user's preferred verification procedure if the user does not want to use a default verification procedure. For JDK developers, the present invention provides the following benefits: support of new signature algorithms (e.g., RSA/MD5 and RSA/SHA1) for verifying signatures, support of enhanced verification procedures offering more flexibility and stronger security, support of Netscape-signed jar files, support of a new keystore provider supporting the Microsoft system store certificate database, and support of the Netscape cert7.db certificate database.

The signatures are verified using the same algorithm that was used to produce the signatures, and the signers are verified using a browser-specific certificate database. The inventive framework also allows a user to configure more than one certificate database and the sequence in which certificate databases are searched. For example, the user can configure the Netscape certificate database to be searched first, followed by the Internet Explorer certificate database. As another example, the user can configure the certificate database to be determined automatically, based on the user's browser type.

The framework supports the ability of the user to go to different databases to determine whether to trust a given signer of an applet. Moreover, the signed applet support is provided without modifying an existing policy file.

One of the preferred implementations of the inventive signed applet framework is a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product comprising computer usable instructions for use in a computer.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having described our invention, what we now claim is set forth below.

What is claimed is:

1. A method for executing a signed applet packaged in a given file, comprising:

upon loading a class, determining whether a signature in the given file type applies to the class;

if so, executing a verification procedure to verify the signature and the identity of a signer that generated the signature;

following a successful verification, determining whether the signer is identified in a policy entry;

if the signer is identified in the policy entry, populating a permission set for the class;

wherein the signature is verified using a given algorithm used to sign the applet; and wherein the step of populating the permission set for the class awards the class a permission as specified in the policy entry.

2. The method as described in claim 1 wherein the given algorithm is selected from the set of algorithms consisting of

DSA/SHA1,

RSA/MD5 and

RSA/SHA1.

3. The method as described in claim 1 further including the steps of:

determining whether the applet has made a request that requires permission; and if so, using the permission set of the class to determine whether the class has the permission.

4. The method as described in claim 3 further including the step of:

responding to the request if the class has the permission.

5. The method as described in claim 1 wherein the step of verifying the identity of the signer verifies that the signer is in a default certificate database and that a certificate of the signer has not expired.

6. The method as described in claim 1 wherein the step of verifying the identity of the signer verifies that the signer contains a certificate chain to a trusted certificate authority, that each certificate in the certificate chain contains a signature that can be verified by a given key, and that each certificate in the certification chain has not expired.

7. The method as described in claim 1 wherein the given file is selected from the set of file types consisting of a first signed jar file, a second signed jar file, and a signed cab file.

8. The method as described in claim 1 wherein the signed applet is executable in a given one of a set of different browser types.

9. A method for executing a signed applet packaged in a given file, comprising:

upon loading each class, determining whether any signatures in the given file applies to the class;

if so, executing a verification procedure to verify the signature and the identity of a signer that generated the signature;

following a successful verification, determining whether the signer is identified in a policy entry;

if the signer is identified in the policy entry, awarding the class a permission as identified in the policy entry;

responsive to a request that requires a permission, using the permission set for the class to determine whether the class has the permission; and wherein the signature is verified using a given algorithm used to sign the applet.

10. The method as described in claim 9 further including the step of responding to the request if the class has the permission.

11. The method as described in claim 9 wherein the step of verifying the identity of the signer verifies that the signer is in a default certificate database and that a certificate of the signer has not expired.

12. The method as described in claim 9 wherein the step of verifying the identity of the signer verifies that the signer contains a certificate chain to a trusted certificate authority, that each certificate certificate in the certificate chain contains a signature that can be verified by a given key, and that each certificate in the certification chain has not expired.

13. The method as described in claim 9 wherein the given file is selected from the set of file types consisting of a first signed jar file, a second signed jar file, and a signed cab file.

14. The method as described in claim 9 wherein the signed applet is executable in a given one of a set of different browser types.

15. A computer program product on a computer readable media including computer usable code for use in a Java runtime environment (JRE), comprising:

an applet class loader for loading a set of applet classes archived in a signed file;

a set of signature engine classes for verifying applet class signatures;

a security manager class callable by the applet class loader upon receipt of an initial request that requires a given permission and, in response thereto invoking a policy file class that verifies a signer based on the existence of a matching certificate in a set of keystores;

wherein at least one signature engine verifies signatures using a given algorithm used to sign the applet classes archived in a signed file; and wherein for populating a permission set for the class, wherein the class is awarded a permission as specified in the policy file class managed by the security manager class.

16. The computer program product as described in claim 15 wherein the set of signature engine classes includes a DSA/SHA1 class, an RSA/MD5 class, and a RSA/SHA1 class.

17. The computer program product as described claim 15 wherein the applet class loader is invoked by a Java Plug-in of the Java runtime environment.

18. The computer program product as described in claim 15 wherein the applet classes are archived in a jar file.

19. The computer program product as described in claim 15 wherein the applet classes are archived in a cab file.

20. A system, comprising:

a browser;

a Java runtime environment;

a set of keystores;

an applet class loader for loading a set of applet classes archived in a signed file;

a set of signature engine classes for verifying applet class signatures;

a security manager class callable by the applet class loader upon receipt of an initial request that requires a given permission and, in response thereto, invoking a policy file class that verifies a signer based on the existence of a matching certificate in the set of keystores;

a means for populating a permission set for the class, wherein the class is awarded a permission as specified in a policy entry in a database managed by the security manager class; and wherein at least one signature engine verifies signatures using a given algorithm used to sign the applet.

21. The system as described in claim 20 wherein the signed file is selected from the set of file types consisting of a first signed jar file, a second signed jar file, and a signed cab file.

* * * * *